(12) United States Patent
Trksak

(10) Patent No.: US 8,481,717 B2
(45) Date of Patent: *Jul. 9, 2013

(54) CROSSLINKING REACTIONS

(75) Inventor: Ralph M. Trksak, Manville, NJ (US)

(73) Assignee: Corn Products Development Inc., Westchester, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/677,892

(22) Filed: Feb. 22, 2007

(65) Prior Publication Data

US 2008/0207894 A1    Aug. 28, 2008

(51) Int. Cl.
- C08B 31/00    (2006.01)
- C08B 33/00    (2006.01)
- C08B 35/00    (2006.01)

(52) U.S. Cl.
USPC .......................................... 536/106

(58) Field of Classification Search
None
See application file for complete search history.

(56) References Cited

U.S. PATENT DOCUMENTS

| | | |
|---|---|---|
| 2,801,242 A | 7/1957 | Kerr et al. |
| 2,852,393 A | 9/1958 | Kerr et al. |
| 5,153,020 A | 10/1992 | Singer et al. |
| 5,855,946 A | 1/1999 | Seib et al. |

FOREIGN PATENT DOCUMENTS

| | | |
|---|---|---|
| EP | 1836903 | 9/2007 |
| JP | 2002503959 | 2/2002 |
| WO | 9854973 | 5/1998 |
| WO | 9854973 A | 12/1998 |
| WO | 9964508 A | 12/1999 |

OTHER PUBLICATIONS

Woo K S et al, "Cross-Linked Resistant Starch: Preparation and Properties" Cereal Chemistry, American Association of Cereal Chemists. Minneapolis, US vol. 79, No. 6, Nov. 1, 2002, pp. 819-825.
Kyungsoo W. et al., "Cross-linking of Wheat Starch and Hydroxypropylated Wheat Starch in Alkaline Slurry with Sodium Trimetaphosphate", Carbohydrate Polymers, Applied Science Publishers, Ltd., Barking, GB, vol. 33, No. 4, Aug. 1, 1997, pp. 263-271.

*Primary Examiner* — Layla Bland
(74) *Attorney, Agent, or Firm* — Thomas C. McKenzie; Karen Kaiser

(57) ABSTRACT

The present invention relates to a process of making a starch crosslinked with sodium trimetaphosphate or with a combination of sodium trimetaphosphate and sodium tripolyphosphate. The reaction has increased efficiency over the standard crosslinking process and/or reduced phosphorus effluent.

15 Claims, No Drawings

CROSSLINKING REACTIONS

The present invention relates to a process of making a starch crosslinked with sodium trimetaphosphate or with a combination of sodium trimetaphosphate and sodium tripolyphosphate.

BACKGROUND OF THE INVENTION

Starch is a complex carbohydrate composed of two types of polysaccharide molecules, amylose, a mostly linear and flexible polymer of D-anhydroglucose units that are linked by alpha-1,4-D-glucosidic bonds, and amylopectin, a branched polymer of linear chains that are linked by alpha-1,6-D-glucosidic bonds.

Research literature indicates that starches high in fiber and/or resistant starch may have numerous beneficial effects, including colonic health and a reduced caloric value. In addition, the starches may provide reduced meal carbohydrates, reduced glycemic and insulimic responses, impact satiety and contribute to sustained energy release, weight management, control of hypoglycemia, hyperglycemia, impaired glucose regulation, insulin resistance syndrome, type II diabetes mellitus, and improved athletic performance, mental concentration and memory.

It is known that certain starch processing operations including chemical, enzymatic, and physical modifications, may increase the dietary fiber content of starch, such as crosslinking with sodium trimetaphosphate or with a combination of sodium trimetaphosphate and sodium tripolyphosphate. Crosslinking with such reagents are known in the art. However, the crosslinking reaction is not efficient. Many skilled artisans increase the amount of reagent in order to drive the reaction and produce a starch with a high level of bound phosphorus. Unfortunately, this results in high levels of unused reagents in the effluent.

Surprisingly, it has now been discovered that chemically crosslinking starch with sodium trimetaphosphate or a combination of sodium trimetaphosphate and sodium tripolyphosphate may be made more efficient by maintaining the pH at a level of 11.5 to 12.0 during the reaction. This increased efficiency may allow the skilled artisan to use less reagent and lower the level of reactants in the effluent.

SUMMARY OF THE INVENTION

The present invention relates to a process of making a starch crosslinked with sodium trimetaphosphate or with a combination of sodium trimetaphosphate and sodium tripolyphosphate. The reaction has increased efficiency over the standard crosslinking process and/or reduced phosphorus effluent.

The term "total dietary fiber content" ("TDF") may include the polysaccharides and remnants of plant materials that are resistant to hydrolysis (digestion) by human alimentary enzymes, including nonstarch polysaccharides, resistant starch, lignin and minor components such as waxes, cutin and suberin. As used herein, TDF is defined as measured by the weight of undigested material separated by filtration as described using the method described by the Association of Official Analytical Chemists, International (AOAC) method 991.43 (Journal of AOAC, Int., 1992, v. 75, No. 3, p. 395-416). Total dietary fiber is reported on a dry basis. The test is set forth in the Examples section, infra.

The term "resistant starch (RS)" is defined as the sum of starch and starch degradation products that are not absorbed in the small intestine of healthy individuals and may be measured by a variety of tests known in the art. Resistant starch is defined herein as measured by treatment with pancreatic alpha amylase in the test described in the Examples section, infra.

As used herein, "high amylose starch" is intended to mean a starch or flour containing at least about 27% amylose for wheat or rice starch or flour and at least about 40% amylose for other sources, by weight of its starch as measured by the potentiometric titration method detailed in the Examples section, infra.

The term "granular starch" as used herein, means a starch which retains its granular structure and has some crystallinity, such that the birefringence and the Maltese cross under polar light are not destroyed.

As used herein, a food product is intended to include all edible products and includes beverages, for human and/or animal consumption.

DETAILED DESCRIPTION OF THE INVENTION

The present invention relates to a process of making a starch crosslinked with sodium trimetaphosphate or with a combination of sodium trimetaphosphate and sodium tripolyphosphate. The reaction has increased efficiency over the standard crosslinking process and/or reduced phosphorus effluent.

The starch used in preparing the present invention may be any starch derived from any native source. A native starch as used herein, is one as it is found in nature. Also suitable are starches derived from a plant obtained by standard breeding techniques including crossbreeding, translocation, inversion, transformation, insertion, irradiation, chemical or other induced mutation, or any other method of gene or chromosome engineering to include variations thereof. In addition, starch derived from a plant grown from induced mutations and variations of the above generic composition which may be produced by known standard methods of mutation breeding are also suitable herein.

Typical sources for the starches are cereals, tubers and roots, legumes and fruits. The native source can be any variety, including without limitation, sourced from corn, potato, sweet potato, barley, wheat, rice, sago, amaranth, tapioca, arrowroot, canna, pea, banana, oat, rye, triticale, and sorghum, as well as low amylose (waxy) and high amylose varieties thereof. Low amylose or waxy varieties is intended to mean a starch or flour containing less than 10% amylose by weight, in one embodiment less than 5%, in another less than 2% and in yet another embodiment less than 1% amylose by weight of the starch. In one embodiment, the high amylose starch or flour contains at least about 50% amylose, in a second embodiment at least about 70% amylose, in a third embodiment at least about 80% amylose, and in a fourth embodiment at least about 90% amylose, all by weight.

The starch is modified using sodium trimetaphosphate (STMP) or a combination of sodium trimetaphosphate and sodium tripolyphosphate (STMP/STPP). The phosphorylation is conducted using methods known in the art such as those described for example in *Modified Starches: Properties and Uses*, Ed. Wurzburg, CRC Press, Inc., Florida (1986), but which have been modified in that the method is conducted at a pH of 11.5 to 12.0 and the pH is maintained in a substantially constant state during the reaction. In one embodiment, the method is further modified in that a concentrated alkali solution is used which results in a high solids reaction mixture. The amount of modification may be varied to get the desired properties and total dietary fiber content.

The starches are chemically modified by reacting the starch in the presence of water with the STMP and/or STPP under specific conditions of pH and temperature to yield a modified starch. One method of reaction involves initially forming a slurry of the starch in water and adding the cross-linking agent to the slurry. The slurry may be from about 15-60% starch, and in one case from about 30-50% starch, by weight. The reaction temperature is from about 25° C. to 70° C., and in one case from about 30° C. to 50° C. The pH of the reaction mixture is adjusted to between 11.5 and 12.0 prior to the start of the reaction and is maintained at such a level throughout the reaction. This is to counteract the acid created during the normal progression of the crosslinking reaction, as well as hydrolysis of the reagents, which tends to bring the pH below the range of 11.5 to 12.0 during the course of the reaction.

The reaction needs to be carried out only for a sufficient time to provide the desired degree of crosslinking, from about 10 minutes to 30 hours and in one case from about 16-24 hours. The skilled artisan will recognize that to get a lower level of crosslinking, the reaction time would be shorter. In one embodiment, from about 0.1-20% sodium sulfate and/or sodium chloride by weight of the starch is added to the slurry. The presence of these salts serves to retard gel formation during the reaction and to accelerate the reaction by increasing the base adsorbed by the starch granules.

The phosphorylating agent is selected from the group consisting of STMP and a mixture of STMP and STPP and in one instance is a mixture of STMP and STPP. Generally, where the mixture is used, it should comprise from about 1-20% by weight STMP and in one case from about 5-16% weight STMP, and from about 0.01-0.2% by weight STPP and in one case from about 0.05-0.16% by weight STPP. The STMP/STPP mixture is advantageously used at a level of from about 1-20% by weight and in one case from about 5-16% by weight, based upon the weight of the starch. Where STMP is used alone, the above ranges may also be employed.

The starches are cross-linked by phosphorylation, although mono-substituted phosphate groups may increase as well, to form distarch phosphate esters and contain at least 0.1% by weight bound (residual) phosphorus. In one embodiment, the bound phosphorus is at least about 0.2%, in another at least about 0.3%, and in still yet another at least 0.35%, by weight of the starch. In a further embodiment, the bound phosphorus is in the range of 0.1-0.4% by weight of the starch.

The pH may be made basic (11.5 to 12.0) using any base which will not interfere with the reaction and is food grade. In one embodiment, the base used is sodium hydroxide and in another embodiment, the sodium hydroxide is used at a level of at least 0.4 to 0.8% on starch weight and in another from 0.55 to 0.65% on starch weight. In another embodiment, the base used is a concentrated base to reduce the dilution of the reaction mixture, in yet another embodiment, an at least 25% alkali solution is used, and in yet another embodiment, an at least 25% sodium hydroxide solution is used. In one embodiment, the percent solids of the reaction mixture is kept as high as practically possible without impeding the reaction or causing the starch to significantly swell. The solids level of the reaction mixture is sensitive to the specific starch based being used, as well as the milling process. For example, an easily mixed slurry can be formed at 33% solids with a waxy rice starch, while a similar viscosity slurry can be formed from tapioca or corn starch at 44% solids. Waxy, sago and high amylose types would fall between those extremes. In another embodiment, the solids level of the reaction mixture is at least 36% and in yet another embodiment, is in the range of 36 to 44% by weight. In yet another embodiment, the solids level is maintained at a high level by introducing no more than 2% water by weight of the starch (dry basis) during the pH adjustment made prior to the beginning of the reaction.

By keeping the reaction pH between 11.5 and 12.0 and/or keeping the percent solids of the reaction mixture high, the efficiency of the reaction is increased such that the desired phosphorus level may be achieved with less STMP or STMP/STPP reagent. This may reduce the effluent phosphorus levels (from unreacted reagent). By maintaining a substantially constant pH of 11.5 to 12.0 during the reaction, the crosslinking reaction is favored, resulting in more crosslinking and less mono-substitution. Thus, there are more diesters formed than using the conventional method.

EXAMPLES

The following examples are presented to further illustrate and explain the present invention and should not be taken as limiting in any regard. All parts and percentages are given by weight and all temperatures in degrees Celsius (° C.) unless otherwise noted.

The following test procedures were used throughout the examples.

A. Bound (Residual) Phosphorus Determination

1. Approximately 10.0 grams of sample was weighed into a quart jar. 600 mL of 5% EDTA (ethylene diamine tetraacetic acid, sodium salt) solution was added and the slurry was mixed for 5 minutes using a magnetic mixer.

2. The starch slurry was filtered using a 2 liter filter flask, Buchner funnel and 11 cm Whatman #1 filter paper. Before the starch cake cracked, four-200 mL aliquots of purified water were poured continuously over the starch cake. The sides of the Büchner funnel were washed down with a wash bottle containing purified water.

3. 1.00 gm of the starch cake was removed from the Büchner and placed in a 125 mL Erlenmeyer flask (the moisture was determined on this sample). 25 mL of 4 N hydrochloric acid was added to the flask, along with 3 or 4 boiling chips.

4. The flask was placed on a hot plate and brought to a rolling boil, then heated for an additional 7 minutes to complete the hydrolysis of the sample, swirling occasionally. The flask mouth was covered with a small watch glass during the heating period to keep evaporation to a minimum. After 7 minutes, it was removed from the hot plate and allowed to cool to room temperature.

5. The contents were quantitatively transferred to a 250 mL volumetric flask. Several washes of purified water were used to rinse any residual in the Erlenmeyer flask into the volumetric flask. The volumetric was then diluted to the volume mark with distilled water, stoppered and shaken to give a uniform mixture.

6. Approximately 10 mL of this solution were drawn into a 10 mL disposable syringe. A 13 mm, 0.2 μm Gelman ion chromatography acrodisc syringe filter was attached to the end. The solution was transferred through the filter directly into a 15 mL disposable centrifuge tube which was then capped and labeled.

7. The collected filtrate was then analyzed on an ICP-AE spectrometer that was standardized in accordance with the manufacturer's recommendations.

8. The results were then converted into % bound (residual) phosphorus as follows:

$$\%\,Phosphorous = \frac{ppm\ Phosphorous \times dilution\ factor\ (0.25\,L) \times 100}{Anhydrous\ sample\ weight\ as\ mg}$$

B. Total Dietary Fiber Determination

The following procedure outlines the determination of total dietary fiber content using AOAC method 991.43 (Journal of AOAC, Int., 1992, v. 75, No. 3, p. 395-416).

The test is performed using Megazyme AOAC 991.43 TDF method kit, K-TDFR:

1. Blanks
With each assay, run two blanks along with samples to measure any contribution from reagents to residue.
2. Samples
 a. Weigh duplicate 1.000±0.005 g samples accurately into 400 ml tall-form beakers.
 b. Add 40 ml 0.05M MES-TRIS blend buffer solution (pH 8.2) to each beaker. Add magnetic stirring bar to each beaker. Stir on magnetic stirrer until sample is completely dispersed in solution.
3. Incubation with heat-stable α-amylase
 a. Add 50 µl heat-stable α-amylase solution, while stirring at low speed.
 b. Cover each beaker with aluminum foil squares.
 c. Place covered samples in shaking water bath at 95-100° C., and incubate for 35 min with continuous agitation. Start timing once all beakers are in hot water bath.
4. Cool.
 a. Remove all sample beakers from hot water bath and cool to 60° C.
 b. Remove foil covers.
 c. Scrape any ring around beaker and gels in bottom of beaker with spatula, if necessary.
 d. Rinse side wall of beaker and spatula with 10 ml distilled water by using pipette.
 e. Adjust temperature of water bath to 60° C.
5. Incubation with protease
 a. Add 100 µl protease solution to each sample.
 b. Cover with aluminum foil.
 c. Incubate in shaking water bath at 60±1° C., with continuous agitation for 30 min. Start timing when temperature of water bath reaches 60° C.
6. pH adjustment
 a. Remove sample beakers from shaking water bath.
 b. Remove covers.
 c. Dispense 5 ml of 0.561 N HCl solution into sample while stirring on magnetic stirrer.
 d. Check pH, which should be 4.1-4.8. Adjust pH, if necessary, with additional 5% NaOH solution or 5% HCl solution.
7. Incubation with amyloglucosidase
 a. Add 200 µl amyloglucosidase solution while stirring on magnetic stirrer.
 b. Replace aluminum cover.
 c. Incubate in shaking water bath at 60° C. for 30 min, with constant agitation. Start timing when temperature of water bath reaches 60° C.
8. Precipitation of dietary fiber with EtOH.
 a. To each sample, add 225 ml 95% EtOH preheated to 60° C. Measure volume after heating. Ratio of EtOH volume to sample volume should be 4:1.
 b. Cover all samples with large sheets of aluminum foil.
 c. Allow precipitate to form at room temperature for 60 minutes.
9. Filtration setup
 a. Tare crucible containing Celite to nearest 0.1 mg.
 b. Wet and redistribute bed of Celite in crucible using 15 ml of 78% EtOH from wash bottle
 c. Apply suction to crucible to draw Celite onto fritted glass as even mat.
10. Filtration
 a. Filter precipitated enzyme digest from step 8 through crucible into a filtration flask.
 b. Using a wash bottle with 78% EtOH transfer all remaining particles to crucible.
11. Wash residue twice with 15 ml portions of the following:
 a. 78% EtOH.
 b. 95% EtOH
 c. Acetone
12. Dry crucible containing residue overnight in 103° C. oven.
13. Cool crucible in desiccator for approximately 1 hr. Weigh crucible containing dietary fiber residue and Celite to nearest 0.1 mg. To obtain residue weight, subtract tare weight, i.e., weight of dried crucible and Celite.
14. Protein and ash determination.
 One residue from each type of fiber is analyzed for protein, and the second residue of the duplicate is analyzed for ash.
 a. Perform protein analysis on residue using Kjeldahl method (AACC 46-10). Use 6.25 factor for all cases to calculate grams of protein.
 b. For ash analysis, incinerate the second residue for 5 hr at 525° C. as described in AACC method 08-01. Cool in desiccator and weigh to nearest 0.1 mg. Subtract crucible and Celite weight to determine ash.

Total dietary fiber is calculated according to the formula presented below and is reported on dry basis unless indicated otherwise.

$$TDF\,(\%) = [(R1-R2)/2 - P - A - \text{blank}]/(m1+m2)/2 \times 100$$

Where:
m1—sample weight 1
m2—sample weight 2
R1—residue weight from m1
R2—residue weight from m 2
A—ash weight from R1
P—protein weight from R2

C. Resistant Starch Analysis

Resistant starch content was determined by a simulated digestion described by Englyst et al. (British Journal of Nutrition, 1996, 75, 327-337; European Journal of Clinical Nutrition, 1992, 46, S33-S50)

Food samples are ground/minced as if masticated. Powder starch samples are screened to a particle size of 250 microns or less. The weight of a sample necessary for analysis is determined based on its carbohydrate content. Starch samples are considered to consist primarily of carbohydrates. Samples are measured to provide 500-600 mg+0.1 mg of carbohydrate per sample. The required amount of a sample is weighed and added to the sample tube. 10 ml of pepsin (0.5%), guar gum (0.5%) in HCl (0.05 M) solution are added to each tube.

Blank and glucose standard tubes are prepared. The blank is 20 ml of a buffer containing 0.25 M sodium acetate and 0.02% calcium chloride. Glucose standards are prepared by mixing 10 ml sodium acetate buffer (described above) and 10 ml of 50 mg/ml glucose solution. Standards are prepared in duplicate.

The enzyme mix is prepared by adding 12 g of porcine pancreatin (Sigma P-7545) to 85 ml of deionized water, mixing well, then centrifuging at 3000 g for 10 minutes. The supernatant is collected and 40 mg of dry invertase (Sigma 1-4504) and 1.0 ml AMG E or AMG 300 L (Novozymes) are added.

The sample tubes are pre-incubated at 37° C. for 30 min, then removed from the bath and 10 ml of sodium acetate buffer is added along with glass balls/marbles (to aid in physical breakdown of the sample during shaking).

5 ml of the enzyme mixture is added to the samples, blank, and standards @ 20-30 sec. intervals. Tubes are shaken horizontally in a 37° C. water bath at approximately 180 strokes/min. Time "zero" represents the first addition of the enzyme mixture to the first tube.

After 20 and 120 minutes, 0.5-ml aliquots are removed from the incubating samples (at the same 20-30 sec intervals) and each placed into a separate tube of 19 ml 66% ethanol (to stop the reaction). After 1 hour, an aliquot is centrifuged in the micro-centrifuge tubes at 3000 g for 10 minutes.

The glucose concentration in each tube is measured using the glucose oxidase/peroxidase method (Megazyme Glucose Assay Procedure GLC9/96). 3 ml of GOPOD are placed into a culture tube, then 0.1 ml of sample aliquot is added, mixed well (light vortex setting) then incubated for 20 minutes at 5000. The incubated samples are tested using the UV spectrophotometer for absorbance at 510. This is a calorimetric procedure.

The degree of starch digestion is determined by calculating the glucose concentration against the glucose standards, using a conversion factor of 0.9. The resistant starch (RS) is the portion of the total starch (TS) that has not been digested by the 120 min (GR 120) time point. Percent resistant starch is calculated as RS (% db)=TS−GR120×100, were TS=100 and GR120=the percent of TS digested in 120 minutes.

D. Amylose Analysis
Potentiometric Determination of Amylose Content

Approximately 0.5 g of a starch (obtained from 1.0 g of ground grain) sample was heated in 10 ml of concentrated calcium chloride (about 30% by weight) to 95° C. for 30 min. The sample was cooled to room temperature, diluted with 5 ml of 2.5% uranyl acetate solution, mixed well, and centrifuged for 5 min at 2000 rpm. The sample was then filtered to give a clear solution. The starch concentration was determined polarimetrically, using 1 cm polarimetric cell. An aliquot of the sample (normally 5 ml) was then directly titrated with a standardized 0.01 N iodine solution while recording the potential using a platinum electrode with a KCl reference electrode. The amount of iodine needed to reach the inflection point was measured directly as bound iodine. The amount of amylose was calculated by assuming 1.0 gram of amylose will bind with 200 milligrams of iodine.

Example 1

The effect of reaction pH on the degree of crosslinking (directly related to TDF) was demonstrated in this example.

Corn starch (2 kg) was slurried in 3000 mL of tap water. To this was added 100 gm Na2SO4 (5% on starch) and sufficient 25% NaOH (added via a high shear mixer to prevent swelling of the starch) to reach a pH of 10.0. 200 gm (10% on starch) of a 99:1 blend of sodium trimetaphosphate (STMP) and sodium tripolyphosphate (STPP) was added to the slurry and the slurry pH was maintained at pH 10.0 with a pH controller (Barnant Digital pH Controller Model No. 501-3400) that controlled a peristaltic pump that added a 3% NaOH solution to maintain pH at the set point (10.0). Another similar reaction was also setup, but was maintained at a pH of 11.5 instead of 10.0.

Samples were taken over time from both reactions and their bound phosphorus was determined. A 48 hour sample from the pH 10.0 reaction was determined to have a bound phosphorus of 0.206%, while a 4 hour sample from the pH 11.5 reaction was found to have a bound phosphorus of 0.225%.

Both of these samples were analyzed for TDF. The pH 11.5 sample (a 4 hour reaction) gave a TDF of 41, as compared to 32 for the pH 10 sample (a 48 hour reaction). While the pH 11.5 reaction had a 9.2% higher bound phosphorus level than the pH 10 sample, its TDF was 28% higher. This indicates that maintaining the pH at a higher level during the STMP/STPP reaction will improve TDF at a similar bound phosphorus level. This is evidence that the bound phosphorus is more likely to be present as a crosslink than as a mono-ester in the reaction where a higher pH is maintained throughout the reaction, as opposed to letting the pH drift downward during the reaction (as in U.S. Pat. No. 5,855,946).

Example 2

Following the reaction conditions given in Ex. 1 of U.S. Pat. No. 5,855,946, corn starch (1000 g, dry basis), water (1400 ml), STMP (sodium trimetaphosphate, 118.8 g, 11.88%, based on dry starch), sodium tripolyphosphate (STPP, 1.2 g, 0.12% on dry starch) and sodium sulfate (100 g, 10% based on dry starch) were combined, and the mixture was adjusted to pH 11.5 by adding a 3% sodium hydroxide solution. The slurry was stirred continuously, warmed to 45° C., and held at 45° C. Samples were taken after 3 hours and 24 hours. The pH was noted to have dropped to 11.06 after 3 hours and 8.96 after 24 hours.

After sampling, each slurry was then adjusted to pH 6.5 by adding a blend of 3:1 distilled water/hydrochloric acid and the starch was collected by filtration and washed with water (4 times with 1500 ml) and dried at room temperature.

This reaction was repeated, but the STMP/STPP level was reduced from a total of 12% to 8% (7.92% STMP/0.08% STPP). The initial alkalinity/pH adjustment was made utilizing 25% NaOH that was added to the starch slurry under high shear agitation (to prevent swelling). Using the 25% NaOH, the alkalinity was adjusted to the equivalent of 50 mL of 0.1 N HCl required to neutralize the alkali in 50 mL slurry. This alkalinity resulted in a pH of 11.9. The slurry was stirred continuously, warmed to 450° C., and held at 45° C. The pH was then maintained at 11.5-11.9 during the entire 24 hours of the reaction (using a 3% NaOH solution). Samples were taken after 3 hours and 24 hours. The results were summarized in Table 1 below.

TABLE 1

Bound Phosphorus and TDF of Reactions.

| Sample Description | Reaction Time | pH controlled | % Solids NaOH | Bound Phosphorus | TDF (% db) AOAC 991.43 |
|---|---|---|---|---|---|
| 13222:94-1A | 3 hours | No | 3 | 0.26% | 30 |
| 13222:94-1B | 24 hours | No | 3 | 0.54% | 78 |
| 13222:117-1A | 3 hours | Yes | 25 | 0.49% | 79 |
| 13222:117-1A | 24 hours | Yes | 25 | 0.65% | 96 |

Through the combination of a slightly higher pH, the maintenance of this pH during the reaction and the reduction of dilution through the use of 25% solids NaOH, the TDF of a 3 hour reaction was improved from 30 (as per U.S. Pat. No. 5,855,946) to 78—a 160% increase. By allowing the reaction to continue as per U.S. Pat. No. 5,855,946 for 24 hours, the TDF improved to 79. However, by utilizing the conditions of this invention, the TDF after 24 hours was improved even further—to 96% (a 21% increase). Most importantly, these improvements in TDF were obtained with a 33% reduction in the amount of STMP/STPP reagent used.

The use of a 25% solids NaOH to reach the starting pH reduced the dilution of the slurry, since use of a 3% NaOH would have introduced approximately 176 additional grams of water to the reaction at the start. This would have diluted the starting slurry and thus reduced the efficiency of the crosslinking reaction. Even with the additional 3% NaOH added to maintain the pH between 11.5 and 11.9, the slurry is not diluted to the solids used in U.S. Pat. No. 5,855,946 until about 3 hours after pH control was initiated. At that time, the TDF has reached about 80% of its final value.

Example 3

To demonstrate that the current invention does not depend solely on the maintenance of the reaction pH, a series of reactions (based on wheat, corn, potato, and Hylon® VII (high amylose corn) starches) were prepared using the conditions of Ex. 1 of U.S. Pat. No. 5,855,946. Starch (1000 g, dry basis), water (1400 ml), STMP (sodium trimetaphosphate, 118.8 g, 11.88%, based on dry starch), sodium tripolyphosphate (STPP, 1.2 g, 0.12% on dry starch) and sodium sulfate (100 g, 10% based on dry starch) were combined, and the mixture was adjusted to pH 11.5 by adding a 3% sodium hydroxide solution. The slurry was stirred continuously, warmed to 45° C., and held at 45° C. Samples were taken after 3 hours and 24 hours.

Each slurry was adjusted to pH 6.5 by adding a blend of 3:1 distilled water/hydrochloric acid and the starch was collected by filtration and washed with water (4 times with 1500 ml) and dried at room temperature.

These reactions were repeated with the only change being the maintenance of the pH at 11.5 using a 3% NaOH solution during the 24 hours of the reaction. Samples were then analyzed for bound phosphorus and TDF. Results are in Table 2.

TABLE 2

Bound Phosphorus and TDF of Reactions.

| Sample Description | Base Starch | Reaction Time (hr) | pH controlled? | Bound Phosphorus | TDF (% db) AOAC 991.43 |
|---|---|---|---|---|---|
| 13222:94-1A | Corn | 3 | No | 0.258 | 30 |
| 13222:94-1B | Corn | 24 | No | 0.544 | 78 |
| 13222:94-2A | Corn | 3 | Yes | 0.271 | 51 |
| 13222:94-2B | Corn | 24 | Yes | 0.479 | 83 |
| 13222:95-1A | Wheat | 3 | No | 0.397 | 74.2 |
| 13222:95-1B | Wheat | 24 | No | 0.537 | 87 |
| 13222:95-2A | Wheat | 3 | Yes | 0.407 | 78.3 |
| 13222:95-2B | Wheat | 24 | Yes | 0.650 | 80 |
| 13222:96-1A | Hylon VII | 3 | No | 0.420 | 76.8 |
| 13222:96-1B | Hylon VII | 24 | No | 0.604 | 84.8 |
| 13222:96-2A | Hylon VII | 3 | Yes | 0.394 | 79.3 |
| 13222:96-2B | Hylon VII | 24 | Yes | 0.659 | 71.9 |
| 13222:97-1A | Potato | 3 | No | 0.552 | 82 |
| 13222:97-1B | Potato | 24 | No | 0.829 | 89.1 |
| 13222:97-2A | Potato | 3 | Yes | 0.529 | 79.5 |
| 13222:97-2B | Potato | 24 | Yes | 0.832 | 74.3 |

While TDF and bound phosphorus were slightly improved in some cases with control of the pH, in general, the maintenance of pH at the starting point of 11.5 did not materially improve the crosslinking induced by the STMP/STPP reagent. Only the non-obvious combination of the maintenance of the pH with the increase of slurry solids during the reaction (from the use of 25% NaOH for the initial pH adjustment) materially improved both the TDF and bound phosphorus obtained—so much so that ⅓ less STMP/STPP reagent was needed to produce the TDF or bound phosphorus levels obtained as per U.S. Pat. No. 5,855,946.

Example 4

To demonstrate the effectiveness of the combination of reaction pH maintenance and the use of 25% NaOH for the initial alkalinity/pH adjustment, another series of products were prepared on corn, wheat, potato and HYLON® VII starch bases.

Starch (1000 g, dry basis), water (1400 ml), STMP (sodium trimetaphosphate, 79.2 g, 7.92%, based on dry starch), sodium tripolyphosphate (STPP, 0.8 g, 0.08% on dry starch) and sodium sulfate (100 g, 10% based on dry starch) were combined. The HYLON VII starch, corn and potato slurries were adjusted to a pH of 11.5 (50 mL alkalinity) and the wheat was adjusted to a pH of 11.3 (30 mL alkalinity) by adding a 25% sodium hydroxide solution that was added to the starch slurry under high shear agitation (to prevent swelling). The pH was then maintained at the starting pH during the entire 24 hours of the reaction (using a 3% NaOH solution). Samples were taken after 3 hours and 24 hours. The results were summarized in Table 3 below.

TABLE 3

Bound Phosphorus and TDF of Reactions.

| Sample Description | Base Starch | Reaction Time (hr) | Bound Phosphorus | TDF (% db) AOAC 991.43 |
|---|---|---|---|---|
| 13222:136-1A | Corn | 3 | 0.211 | 47 |
| 13222:136-1B | Corn | 24 | 0.44 | 95 |
| 13222:136-2A | Wheat | 3 | 0.258 | 88 |
| 13222:136-2B | Wheat | 24 | 0.508 | 96 |
| 13222:136-3A | Hylon VII | 3 | 0.412 | 47 |
| 13222:136-3B | Hylon VII | 24 | 0.787 | 95 |
| 13222:136-4A | Potato | 3 | 0.284 | 66 |
| 13222:136-4B | Potato | 24 | 0.509 | 96 |

These results should be compared versus the samples prepared from the same starch bases in Example 3, where 50% higher levels of STMP/STP were used in the process that is similar to that described in Ex. 1 of U.S. Pat. No. 5,855,946, with the maintenance of the initial pH during the reaction.

Table 4 shows the comparisons between these two Examples.

TABLE 4

Comparison of the current invention with reactions using low solids NaOH

| Sample Description | Base Starch | Reaction Time (hr) | 25% NaOH | Bound Phosphorus | TDF AOAC 991.43 | % Selb |
|---|---|---|---|---|---|---|
| 13222:136-1B | Corn | 24 | Yes | 0.44 | 95 | 121.8 |
| 13222:94-1B | Corn | 24 | No | 0.544 | 78 | 100 |
| 13222:136-1A | Corn | 3 | Yes | 0.211 | 47 | 156.6 |
| 13222:94-1A | Corn | 3 | No | 0.258 | 30 | 100 |
| 13222:136-3B | Hylon VII | 24 | Yes | 0.787 | 95 | 112.0 |
| 13222:96-1B | Hylon VII | 24 | No | 0.604 | 84.8 | 100 |
| 13222:136-3A | Hylon VII | 3 | Yes | 0.412 | 47 | 61.1 |
| 13222:96-1A | Hylon VII | 3 | No | 0.420 | 76.8 | 100 |
| 13222:136-4B | Potato | 24 | Yes | 0.509 | 96 | 107.7 |
| 13222:97-1B | Potato | 24 | No | 0.829 | 89.1 | 100 |
| 13222:136-4A | Potato | 3 | Yes | 0.284 | 66 | 80.5 |
| 13222:97-1A | Potato | 3 | No | 0.552 | 82 | 100 |
| 13222:136-2B | Wheat | 24 | Yes | 0.508 | 96 | 110.4 |
| 13222:95-1B | Wheat | 24 | No | 0.537 | 87 | 100 |
| 13222:136-2A | Wheat | 3 | Yes | 0.258 | 88 | 118.6 |
| 13222:95-1A | Wheat | 3 | No | 0.397 | 74.2 | 100 |

Even with 50% higher levels of STMP/STP (12% total compared to 8% total in the current example) and the maintenance of slurry pH, the 24 hour reactions utilizing 25% NaOH for the initial alkalinity adjustment gave higher bound phosphorous and higher TDF values than those using the lower (3%) solids NaOH as specified in U.S. Pat. No. 5,855,946. While the HYLON VII starch and potato starch bases did not show an improvement with the use of the 25% solids NaOH in a 3 hour reaction, wheat and corn starches exhibited 18-56% higher TDF values using the process of this invention.

After reacting the starches for 24 hours, the starches made using the 25% NaOH for the initial pH adjustment gave 7-22% higher TDF values than reactions using 3% NaOH as specified in U.S. Pat. No. 5,855,946.

I claim:

1. A process of preparing a granular corn or wheat starch comprising crosslinking the corn or wheat starch using sodium trimetaphosphate or a combination of sodium trimetaphosphate and sodium tripolyphosphate:
   a. wherein the pH is adjusted to between 11.5 and 12.0 prior to the crosslinking reaction using an at least 25% alkali solution and is maintained at 11.5 to 12.0 throughout the crosslinking reaction;
   b. wherein no more than 2% water by weight of the starch (dry basis) is added to the starch during the pH adjustment prior to the crosslinking reaction;
   c. wherein the sodium trimetaphosphate is used in an amount of from about 5-16% by weight of the starch;
   d. wherein the reaction is conducted at a solids level of at least 36% by weight; and
   e. wherein the reaction is conducted for a period of from about 10 minutes to 30 hours.

2. The process of claim 1, wherein the pH is maintained at 11.5.

3. The process of claim 1, wherein the reaction is conducted at a solids level of from 36% to 44% by weight.

4. The process of claim 1, wherein the reaction is conducted at a temperature from about 25° C. to 70° C.

5. The process of claim 4, wherein the reaction is conducted at a temperature from about 30° C. to 50° C.

6. The process of claim 1, wherein the reaction is conducted for a period of from about 3 hours to 24 hours.

7. The process of claim 6, wherein the reaction is conducted for a period of from about 16 to 24 hours.

8. The process of claim 1, wherein from about 0.1-20% sodium sulfate and/or sodium chloride by weight of the starch is added to the reaction mixture.

9. The process of claim 1, wherein from about 0.01 to 0.2% sodium tripolyphosphate by weight of the starch is used.

10. The process of claim 1, wherein from about 0.05-0.16% sodium tripolyphosphate by weight of the starch is used.

11. The process of claim 1, wherein the combination of the STMP/STPP is at a level of from about 1 to 20% by weight of the starch.

12. The process of claim 11, wherein the combination of the STMP/STPP is at a level of from about 5 to 16% by weight of the starch.

13. The process of claim 1, wherein the reaction mixture is made basic using sodium hydroxide.

14. The process of claim 13, wherein the sodium hydroxide is used at a level of at least 0.4 to 0.8% on starch weight.

15. The process of claim 14, wherein the sodium hydroxide is used at a level of from 0.55 to 0.65% on starch weight.

* * * * *